United States Patent
Kang et al.

(10) Patent No.: US 10,237,087 B2
(45) Date of Patent: Mar. 19, 2019

(54) METHOD FOR CONTROLLING TRANSMISSION SPEED AND ELECTRONIC DEVICE THEREOF

(71) Applicant: Samsung Electronics Co., Ltd., Suwon-si, Gyeonggi-do (KR)

(72) Inventors: Hyuk Kang, Suwon-si (KR); Guneet Singh Khurana, Suwon-si (KR); Kyoung-Hoon Kim, Seoul (KR); Woo-Kwang Lee, Suwon-si (KR); Hyoung-Woo Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 14/474,758

(22) Filed: Sep. 2, 2014

(65) Prior Publication Data

US 2015/0063337 A1    Mar. 5, 2015

(30) Foreign Application Priority Data

Sep. 2, 2013 (KR) .................. 10-2013-0105123
Apr. 4, 2014 (KR) .................. 10-2014-0040338

(51) Int. Cl.
*H04L 12/40* (2006.01)
*G06F 13/38* (2006.01)
*H04L 12/825* (2013.01)
*H04L 12/12* (2006.01)
(Continued)

(52) U.S. Cl.
CPC ........ *H04L 12/4013* (2013.01); *G06F 13/382* (2013.01); *G06F 13/385* (2013.01);
(Continued)

(58) Field of Classification Search
CPC .......... H04L 12/4013; H04L 12/40136; H04L 1/0001; H04L 1/0002; H04L 1/0026; H04L 1/0034; H04L 12/40032; H04L 12/12; H04L 47/25; H04L 25/08; H04W 88/06; H04W 76/02; H04W 76/045; H04W 48/06; H04W 36/06; H04W 36/14; H04W 36/165; H04W 36/30; H04W 36/36;
(Continued)

(56) References Cited

U.S. PATENT DOCUMENTS

2007/0081453 A1* 4/2007 Hsu .................. H04L 47/10
370/229
2010/0315135 A1* 12/2010 Lai .................. G06F 5/06
327/145
(Continued)

FOREIGN PATENT DOCUMENTS

JP    2002041441 A    2/2002
JP    2007172160 A    7/2007
(Continued)

*Primary Examiner* — Joshua Kading
(74) *Attorney, Agent, or Firm* — Jefferson IP Law, LLP

(57) ABSTRACT

A method of operating an electronic device is provided. The method includes communicating data with a wireless network using a wireless communication, connecting to an external electronic device using a wired communication, exchanging data with the external device at a first data throughput using the wired communication while performing the wireless communication, and changing the first data throughput to a second data throughput while performing the wireless communication.

16 Claims, 13 Drawing Sheets

(51) Int. Cl.
*H04W 28/02* (2009.01)
*H04L 25/08* (2006.01)
*H04W 24/04* (2009.01)
*H04L 12/931* (2013.01)

(52) U.S. Cl.
CPC ........ *H04L 12/12* (2013.01); *H04L 12/40032* (2013.01); *H04L 25/08* (2013.01); *H04L 47/25* (2013.01); *H04L 49/50* (2013.01); *H04W 24/04* (2013.01); *H04W 28/0231* (2013.01)

(58) Field of Classification Search
CPC ......... H04W 28/0231; H04W 28/0236; H04W 28/0247; H04W 28/0284; H04W 24/04; G06F 13/382; G06F 13/385
See application file for complete search history.

(56) References Cited

U.S. PATENT DOCUMENTS

| | | | | |
|---|---|---|---|---|
| 2012/0311359 | A1* | 12/2012 | Jaramillo | H04L 25/0298 713/321 |
| 2012/0317446 | A1* | 12/2012 | Jaramillo | G06F 11/221 714/43 |
| 2013/0156088 | A1* | 6/2013 | Jin | H04L 25/03834 375/236 |
| 2013/0185462 | A1 | 7/2013 | Manabe | |
| 2013/0254440 | A1* | 9/2013 | Toivanen | G06F 13/10 710/63 |
| 2013/0336334 | A1* | 12/2013 | Gilbert | H04J 3/16 370/458 |
| 2015/0134863 | A1* | 5/2015 | Hsieh | H04L 43/0894 710/106 |
| 2015/0319108 | A1* | 11/2015 | Maung | H04L 12/6418 370/359 |
| 2017/0315946 | A1* | 11/2017 | Maung | G06F 13/385 |

FOREIGN PATENT DOCUMENTS

| | | |
|---|---|---|
| JP | 2012063817 A | 3/2012 |
| JP | 2012093926 A | 5/2012 |
| JP | 2013016096 A | 1/2013 |
| KR | 20090024419 A | 3/2009 |
| KR | 20100023966 A | 3/2010 |

* cited by examiner

METHOD FOR CONTROLLING TRANSMISSION SPEED AND ELECTRONIC DEVICE THEREOF

CROSS-REFERENCE TO RELATED APPLICATION(S)

This application claims the benefit under 35 U.S.C. § 119(a) of a Korean patent application filed on Sep. 2, 2013 in the Korean Intellectual Property Office and assigned Serial number 10-2013-0105123, and of a Korean patent application filed on Apr. 4, 2014 in the Korean Intellectual Property Office and assigned Serial number 10-2014-0040338, the entire disclosure of each of which is hereby incorporated by reference.

TECHNICAL FIELD

The present disclosure relates to a method for controlling a transmission speed and an electronic device thereof.

BACKGROUND

If an electronic device detects a connection of a Universal Serial Bus (USB) device for data transmission, the electronic device determines a connection speed with respect to the USB device. For example, if the USB device supports USB 3.0, the electronic device may attempt a connection at a speed such as a Super Speed (e.g., a maximum connection speed supported in USB 3.0), a High Speed (e.g., a maximum connection speed supported in USB 2.0), a Full Speed (e.g., a maximum connection speed connected in USB 1.1), and a Low Speed (e.g., a maximum connection speed supported in USB 1.0).

In addition, the electronic device may detect a connection of a Mobile High-definition Link (MHL) connector for data transmission, and may determine a connection speed with respect to the electronic device connected to the MHL connector.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method in which, when a first electronic device communicates with a third electronic device in a state in which the first electronic device is connected to a second electronic device via a Universal Serial Bus (USB) 3.0 port, the first electronic can switch to any one of a USB 3.0 interface and a USB 2.0 interface according to a communication state, which leads to an avoidance of a communication error caused by the use of the USB 3.0 interface, thereby improving telephony quality of a user.

Another aspect of the present disclosure is to provide an apparatus and method in which, when a first electronic device communicates with a third electronic device in a state in which the first electronic device is connected to a second electronic device via a Mobile High-definition Link (MHL) 3.0 port, the first electronic device can switch to any one of an MHL 3.0 interface and an MHL 2.0 interface according to a communication state with the third electronic device, thereby improving user convenience through an effective data communication considering the communication state.

Another aspect of the present disclosure is to provide an apparatus and method in which a host electronic device for transmitting/receiving data with respect to an electronic device not having a switching function of a UBS interface can control a data transmission speed of another electronic device, thereby improving user convenience.

In accordance with an aspect of the present disclosure, a method of operating an electronic device is provided. The method includes communicating, by the electronic device, data with a wireless network using a wireless communication, connecting, by the electronic device, to an external electronic device using a wired communication, exchanging, by the electronic device, data with the external device at a first data throughput using the wired communication while performing the wireless communication, and changing, by the electronic device, the first data throughput to a second data throughput while performing the wireless communication.

In accordance with another aspect of the present disclosure, a method of operating an electronic device is provided. The method includes communicating, by the electronic device, data with a wireless network, using a wireless communication, connecting, by the electronic device, to an external electronic device using a wired communication, communicating, by the electronic device, with the external electronic device at a first data throughput using the wired communication while performing the wireless communication, and communicating, by the electronic device, with the external electronic device using the wired communication, at least a portion of the data which would otherwise be communicated via the wireless communication.

In accordance with another aspect of the present disclosure, a method of operating an electronic device is provided. The method includes communicating, by the electronic device, data with a wireless network using a wireless communication, connecting, by the electronic device, to an external electronic device using a wired communication, confirming, by the electronic device, a connection of a connector for the wired communication while performing the wireless communication, monitoring a Received Signal Strength Indicator (RSSI) of the wireless communication as the operation of confirming the connection of the connector, and controlling the wired communication on the basis of the RSSI.

In accordance with another aspect of the present disclosure, an electronic device is provided. The electronic device includes a communication module configured to perform a wireless communication with a wireless network, to connect to an external electronic device using a wired communication, and to exchange data with the external device at a first data throughput using the wired communication while performing the wireless communication, and a processor configured to change the first data throughput to a second data throughput while performing the wireless communication.

In accordance with another aspect of the present disclosure, an electronic device is provided. The electronic device includes a communication module configured to communicate data with a wireless network, using a wireless communication, to connect to an external electronic device using a wired communication, to communicate with the external electronic device at a first data throughput using the wired communication while performing the wireless communication, and to communicate with the external electronic device using the wired communication, at least a portion of the data which would otherwise be communicated via the wireless communication, and a processor configured to control an overall operation of the electronic device.

In accordance with another aspect of the present disclosure, an electronic device is provided. The electronic device includes a communication module configured to perform a wireless communication with a wireless network, and to connect to an external electronic device using a wired communication, and a processor configured to confirm a connection of a connector for the wired communication while performing the wireless communication, to monitor an RSSI of the wireless communication as the operation of confirming the connection of the connector, and to control the wired communication on the basis of the RSSI.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
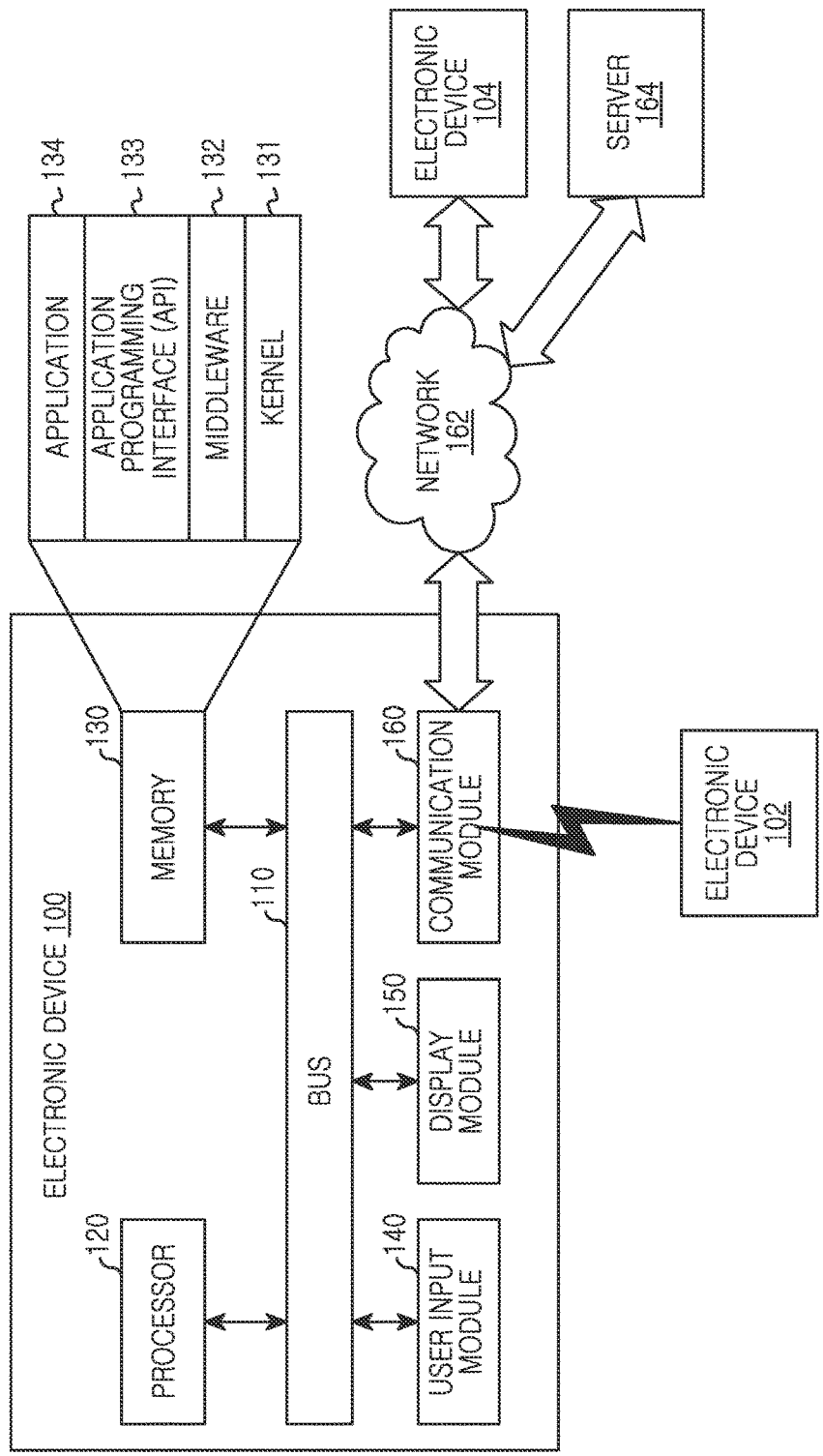
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to the present disclosure may be a device including a communication function. For example, the electronic device may be one or more combinations of various devices such as a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a MPEG-1 Audio Layer 3 (MP3) player, a mobile medical device, an electronic bracelet, an electronic necklace, an electronic appcessory, a camera, a wearable device, an electronic clock, a wrist watch, a smart white appliance (e.g., a refrigerator, an air conditioner, a cleaner, an artificial intelligent robot, a TeleVision (TV), a Digital Video Disk (DVD) player, an audio, an oven, a microwave oven, a washing machine, an air purifier, an electronic picture frame, and/or the like), various medical devices (e.g., Magnetic Resonance Angiography (MRA), Magnetic Resonance Imaging (MRI), Computed Tomography (CR), imaging equipment, ultrasonic instrument, and/or the like), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, an electronic equipment for ship (e.g., a vessel navigation device, a gyro compass, and/or the like), avionics, a security device, an electronic costume, an electronic key, a camcorder, game consoles, a Head-Mounted Display (HMD), a flat panel display device, an electronic album, a furniture or a part of building/constructions including a communication function, an electronic board, an electronic signature receiving device, a projector, and/or the like. It is apparent to those ordinarily skilled in the art that the electronic device according to the present disclosure is not limited to the aforementioned devices.

FIG. 1 is a block diagram of an electronic device according to an embodiment of the present disclosure.

Referring to FIG. 1, an electronic device 100 may include a bus 110, a processor 120, a memory 130, a user input module 140, a display module 150, or a communication module 160.

The bus 110 may be a circuit for connecting the aforementioned constitutional elements and for delivering a communication (e.g., a control message) between the aforementioned constitutional elements.

For example, the processor 120 may receive an instruction from other constitutional elements (e.g., the memory 130, the user input module 140, the display module 150, the communication module 160, and/or the like), and thus may interpret the received instruction and execute arithmetic or data processing according to the interpreted instruction.

The memory 130 may store an instruction or data received from the processor 120 or other constitutional elements (e.g., the user input module 140, the display module 150, the communication module 160, and/or the like) or generated by the processor 120 or other constitutional elements. The memory 130 may include programming modules such as a kernel 131, a middleware 132, an Application Programming Interface (API) 133, an application 134, and/or the like. Each of the aforementioned programming modules may include software, firmware, or hardware entities or may include at least two or more combinations thereof.

The kernel 131 may control or manage the remaining other programming modules, for example, system resources (e.g., the bus 110, the processor 120, the memory 130, and/or the like) used to execute an operation or function implemented in the middleware 132, the API 133, the application 134, and/or the like. In addition, the kernel 131 may provide a controllable or manageable interface by accessing individual constitutional elements of the electronic device 100 in the middleware 132, the API 133, the application 134, and/or the like.

The middleware 132 may perform an intermediary role so that the API 133 or the application 134 communicates with the kernel 131 to exchange data. In addition, regarding task requests received from the (plurality of) applications 134, the middleware 132 may perform load balancing for the task request by using a method of assigning a priority or the like capable of using a system resource (e.g., the bus 110, the processor 120, the memory 130, and/or the like) of the electronic device 100 to at least one application among the (plurality of) applications 134.

The API 133 may include at least one interface or function for file control, window control, video processing, or character control, and/or the like, as an interface capable of controlling a function provided by the application 134 in the kernel 131 or the middleware 132.

The user input module 140 may receive an instruction or data from a user and deliver the instruction to the processor 120 or the memory 130 via the bus 110. The display module 150 may display video, image, data, and/or the like, to the user.

The communication module 160 may connect a communication between another electronic device 102 and the electronic device 100. The communication module 160 may support a specific near-field communication protocol (e.g., Wireless Fidelity (WiFi), BlueTooth (BT), Near Field Communication (NFC), or specific network communication 162 (e.g., Internet, Local Area Network (LAN), Wide Area Network (WAN) telecommunication network, cellular network, satellite network, Plain Old Telephone Service (POTS), and/or the like). Each of the electronic devices 102 and 104 may be a device which is the same (e.g., the same type) as the electronic device 100 or may be a different (e.g., a different type) device. The electronic device 100 may communicate with a server 164 over the network communication 162.

Figure 2:
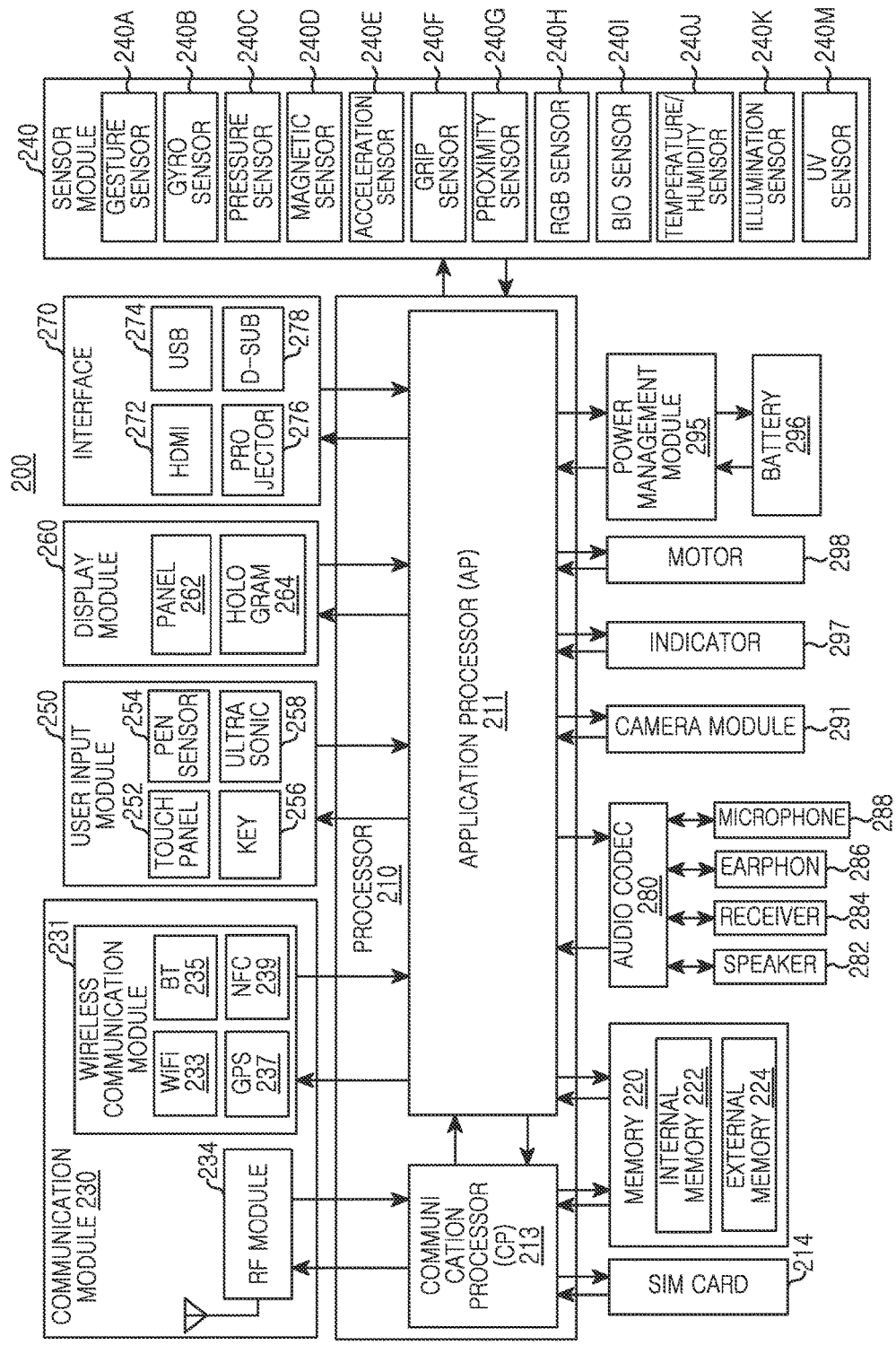
FIG. 2 is a block diagram of a hardware structure according to an embodiment of the present disclosure.

FIG. 2 is a block diagram of a hardware structure according to an embodiment of the present disclosure. A hardware 200 may be the electronic device 100 of FIG. 1.

Referring to FIG. 2, the hardware 200 may include one or more processors 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, a motor 298, and/or the like.

The processors 210 (e.g., the aforementioned processor 120) may include one or more Application Processors (APs) 211 or one or more Communication Processors (CPs) 213. The processor 210 may be the processor 120 of FIG. 1. Although it is described in FIG. 2 that the AP 211 and the CP 213 are included in the processor 210, the AP 211 and the CP 213 may be respectively included in different Integrated Circuit (IC) packages. According to various embodiments of the present disclosure, the AP 211 and the CP 213 may be included in one IC package. According to various embodiments of the present disclosure, the processor 210 may access a server to edit application group information, and may access the server to search for application group information including information on at least one interested application. According to various embodiments of the present disclosure, processor 210 may determine whether to control a first data communication state on the basis of a second data communication state. Herein, a first data communication is a wired communication, and may use a Universal Serial Bus (USB) or Mobile High-definition Link (MHL) communication interface, and/or the like. A second data communication may use a communication method such as CDMA/LTE/GSM, WIFI/WIFI DIRECT, and/or the like. In addition, the aforementioned data communication may have a different data throughput according to a version.

In addition, the processor 210 may determine whether the second data communication state is any one of a determined first communication state and a determined second communication state. If the processor 210 determines that the second data communication state is the determined first communication state, then the processor 210 may determine to use a USB 3.0 interface as a data transmission/reception means with respect to a second electronic device.

In addition, the processor 210 may determine whether the second data communication state is any one of the determined first communication state and the determined second communication state. If the processor 210 determines that the second data communication state is the determined first communication state, then the processor 210 may determine to use an MHL 3.0 interface as the data transmission/reception means with respect to the second electronic device. In addition, if the processor 210 determines that the communication state is the determined second communication state, the processor 210 may determine to use a USB 2.0 interface as the transmission/reception means with respect to the second electronic device. In addition, if the processor 210 determines that the communication state is the determined second communication state, the processor 210 may determine to use an MHL 2.0 interface as the transmission/reception means with respect to the second electronic device.

The AP 211 may control a plurality of hardware or software constitutional elements connected to the AP 211 by driving an operating system or an application program, and may perform a variety of data processing and computation including multimedia data. The AP 211 may be implemented with a System on Chip (SoC). According to various embodiments of the present disclosure, the processor 210 may further include a Graphic Processing Unit (GPU, not shown).

The CP 213 may perform a function of managing a data link and converting a communication protocol in a communication between other electronic devices connected with an electronic device (e.g., the electronic device 100) including the hardware 200 through a network. The CP 213 may be implemented with a SoC. According to various embodiments of the present disclosure, the CP 213 may perform at least a part of a multimedia control function. The CP 213 may identify and authenticate a terminal in a communication network by using a Subscriber Identification Module (SIM) (e.g., the SIM card 214). In addition, the CP 213 may provide the user with services such as voice telephony, video telephony, text messages, packet data, and/or the like.

In addition, the CP 213 may control data transmission/reception of the communication module 230. Although it is illustrated in FIG. 2 that the constitutional elements such as the CP 213, the power management module 295, the memory 220, and/or the like, are separate constitutional elements independent of the AP 211, according to various embodiments of the present disclosure, the AP 211 may be implemented to include at least a part (e.g., the CP 213) of the aforementioned elements.

According to various embodiments of the present disclosure, the AP 211 or the CP 213 may load an instruction or data, received from a non-volatile memory connected thereto or at least one of other constitutional elements, to a volatile memory and then may process the instruction or data. In addition, the AP 211 or the CP 213 may store data, received from the at least one of other constitutional elements or generated by the at least one of other constitutional elements, into the non-volatile memory.

The SIM card 214 may be a card in which a SIM is implemented, and may be inserted to a slot formed at a specific location of the electronic device. The SIM card 214 may include unique identification information (e.g., an Integrated Circuit Card Identifier (ICCID)) or subscriber information (e.g., an International Mobile Subscriber Identity (IMSI)).

The memory 220 may include an internal memory 222 or an external memory 224. The memory 220 may be the memory 130 of FIG. 1. The internal memory 222 may include at least one of a volatile memory (e.g., a Dynamic Random Access-Memory (RAM) (DRAM), a Static RAM (SRAM), a Synchronous Dynamic RAM (SDRAM), and/or the like) or a non-volatile memory (e.g., a One Time Programmable Read-Only Memory (OTPROM), a Programmable ROM (PROM), an Erasable and Programmable ROM (EPROM), an Electrically Erasable and Programmable ROM (EEPROM), a Mask ROM, a Flash ROM, a NAND flash memory, a NOR flash memory, and/or the like). According to various embodiments of the present disclosure, the internal memory 222 may have a form of a Solid State Drive (SSD). The external memory 224 may further include Compact Flash (CF), Secure Digital (SD), Micro Secure Digital (Micro-SD), Mini Secure digital (Mini-SD), extreme Digital (xD), memory stick, and/or the like.

The communication module 230 may include a wireless communication module 231 or a Radio Frequency (RF) module 234. The communication module 230 may be the communication module 160 of FIG. 1. The wireless communication module 231 may include a WiFi 233, a BT 235, a GPS 237, or an NFC 239. For example, the wireless communication module 231 may provide a wireless communication function by using a radio frequency. In addition or in general, the wireless communication module 231 may include a network interface (e.g., a LAN card), modem, and/or the like for connecting the hardware 200 to a network (e.g., Internet, LAN, WAN, telecommunication network, cellular network, satellite network, POTS, and/or the like). According to various embodiments of the present disclosure, the communication module 230 may perform a second data communication with a third electronic device while performing the first data communication with the second electronic device. In addition, the communication module 230 may transmit/receive data with respect to the second electronic device by using a USB 3.0 interface. In addition, the communication module 230 may transmit/receive data with respect to the second electronic device by using an MHL 3.0 interface.

The RF module 234 may serve to transmit/receive data, for example, an RF signal or a paged electronic signal. Although not shown, the RF module 234 may include a transceiver, a Power Amp Module (PAM), a frequency filter, a Low Noise Amplifier (LNA), and/or the like. In addition, the RF module 234 may further include a component (e.g., a conductor, a conducting wire, and/or the like) for transmitting/receiving a radio wave on a free space in a wireless communication.

The sensor module 240 may include at least one of a gesture sensor 240A, a gyro sensor 240B, a pressure sensor 240C, a magnetic sensor 240D, an acceleration sensor 240E, a grip sensor 240F, a proximity sensor 240G, a Red, Green, Blue (RGB) sensor 240H, a bio sensor 240I, a temperature/humidity sensor 240J, an illumination sensor 240K, and an Ultra Violet (UV) sensor 240M. The sensor module 240 may measure a physical quantity or detect an operation state of the electronic device, and thus may convert the measured or detected information into an electric signal. In addition/in general, the sensor module 240 may include an E-node sensor (not shown), an ElectroMyoGraphy (EMG) sensor (not shown), an ElectroEncephaloGram (EEG) sensor (not shown), an ElectroCardioGram (ECG) sensor (not shown), a fingerprint sensor, and/or the like. The sensor module 240 may further include a control circuit for controlling at least one or more sensors included therein.

The user input module 250 may include a touch panel 252, a (digital) pen sensor 254, a key 256, an ultrasonic input unit 258, and/or the like. The user input module 250 may be the user input module 140 of FIG. 1. The touch panel 252 may recognize a touch input by using at least one of an electrostatic type, a pressure-sensitive type, and an ultrasonic type. In addition, the touch panel 252 may further include a controller (not shown). In case of the electrostatic type, not only direct touch but also proximity recognition is also possible. The touch penal 252 may further include a tactile layer. In this case, the touch panel 252 may provide the user with a tactile reaction.

The (digital) pen sensor 254 may be implemented by using the same or similar method of receiving a touch input of the user or by using an additional sheet for recognition. The key 256 may be a keypad or a touch key. The ultrasonic input unit 258 is a device by which a terminal detects a sound wave through a microphone (e.g., a microphone 288) by using a pen which generates an ultrasonic signal, and is a device capable of radio recognition. According to various embodiments of the present disclosure, the hardware 200 may use the communication module 230 to receive a user input from an external device (e.g., a network, a computer, or a server) connected thereto.

The display module 260 may include a panel 262 or a hologram 264. The display module 260 may be the display module 150 of FIG. 1. The panel 262 may be a Liquid-Crystal Display (LCD), an Active-Matrix Organic Light-Emitting Diode (AM-OLED), and/or the like. The panel 262 may be implemented in a flexible, transparent, or wearable manner. The panel 262 may be constructed as one module with the touch panel 252. The hologram 264 may use an interference of light and show a stereoscopic image in the air. According to various embodiments of the present disclosure, the display module 260 may further include a control circuit for controlling the panel 262 or the hologram 264.

The interface 270 may include a High-Definition Multimedia Interface (HDMI) 272, a USB 274, a projector 276, or a D-subminiature (D-sub) 278. In addition or in general, the interface 270 may include Secure Digital (SD)/Multi-Media Card (MMC) (not shown) or Infrared Data Association (IrDA) (not shown).

The audio codec 280 may bilaterally convert a voice and electronic signal. The audio codec 280 may convert audio information which is input or output through a speaker 282, a receiver 284, an earphone 286, the microphone 288, and/or the like.

The camera module 291 is a device for image and video capturing. According to various embodiments of the present disclosure, the camera module 291 may include one or more image sensors (e.g., a front lens or a rear lens), an Image Signal Processor (ISP) (not shown), or a flash Light Emitting Diode (LED) (not shown).

The power management module 295 may manage power of the hardware 200. Although not shown, the power management module 295 may include a Power Management Integrated Circuit (PMIC), a charger IC, or a battery fuel gauge.

The PMIC may be equipped inside an IC or SoC semiconductor. Charging may be classified into wired charging and wireless charging. The charger IC may charge a battery, and may avoid over-voltage or over-current flowing from a charger. According to various embodiments of the present disclosure, the charger IC may further include a charger IC for at least one of the wired charging and the wireless charging. The wireless charging may be classified into a magnetic resonance type, a magnetic induction type, and an electromagnetic type. An additional circuit for the wireless charging may be added, such as a coil loop, a resonant circuit, a rectifier, and/or the like.

The battery gauge may measure a residual quantity of the battery 296 and a voltage, current, and temperature during charging. The battery 296 may generate electricity to supply power source, and may be a rechargeable battery.

The indicator 297 may indicate a specific state (e.g., a booting state, a message state, a charging state, and/or the like), of the hardware 200 or a part thereof (e.g., the AP 211). The motor 298 may convert an electric signal into a mechanical vibration. According to various embodiments of the present disclosure, the hardware 200 may include an MCU (not shown). The MCU may control the sensor module 240.

Although not shown, the hardware 200 may include a processing unit (e.g., a Graphics Processing Unit (GPU)) for supporting mobile TV. The processing unit for supporting mobile TV may process media data according to a protocol of, for example, Digital Multimedia Broadcasting (DMB), Digital Video Broadcasting (DVB), media flow, and/or the like.

Names of the aforementioned constitutional elements of the hardware according to various embodiments of the present disclosure may vary depending on a type of electronic device. According to various embodiments of the present disclosure, the hardware (e.g., hardware 200) may include at least one of the aforementioned constitutional elements. Some of the constitutional elements may be omitted, or additional other constitutional elements may be further included. In addition, some of the constitutional elements of the hardware of the present disclosure may be combined and constructed to one entity, so as to equally perform functions of corresponding constitutional elements before combination.

Figure 3:
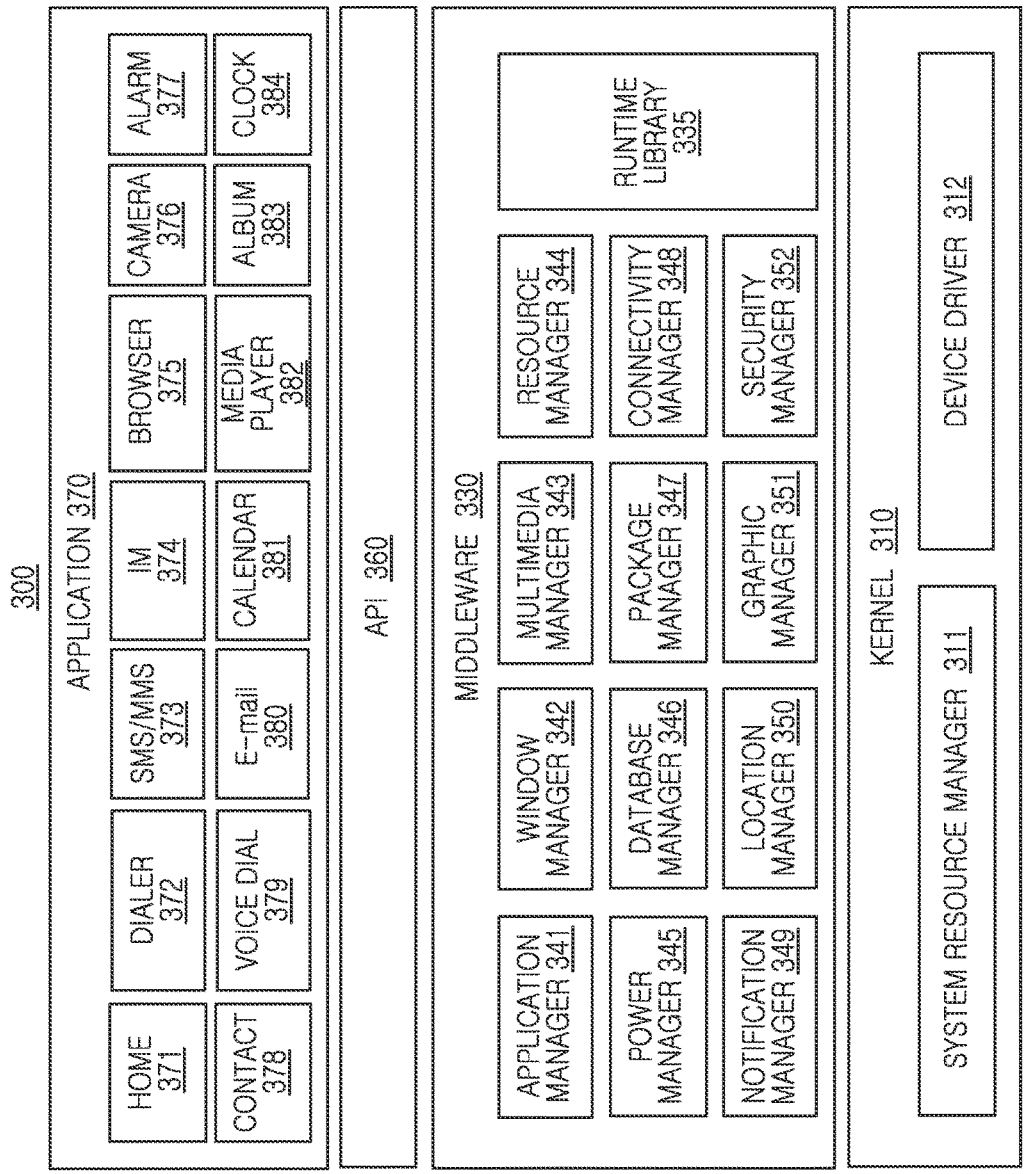
FIG. 3 is a block diagram of a programming module according to an embodiment of the present disclosure.

FIG. 3 is a block diagram of a programming module according to an embodiment of the present disclosure.

Referring to FIG. 3, a programming module 300 may be included (e.g., stored) in the electronic device 100 (e.g., the memory 130) of FIG. 1. At least some parts of the programming module 300 may include software, firmware, hardware, or a combination of at least two or more of software, firmware, and hardware. The programming module 300 may include an Operating System (OS) implemented in a hardware (e.g., the hardware 200) and that controls a resource related to an electronic device (e.g., the electronic device 100) or various applications (e.g., an application 370) driven on the OS. For example, the OS may be Android, iOS, Windows, Symbian, Tizen, Bada, and/or the like. Referring to FIG. 3, the programming module 300 may include a kernel 310, a middleware 330, an API 360, the application 370, and/or the like.

The kernel 310 may include a system resource manager 311, a device driver 312, and/or the like. The device driver 312 may include an Inter-Process Communication (IPC) driver (not shown).

The middleware 330 may include a plurality of modules pre-implemented to provide a function commonly required by the application 370. In addition, the middleware 330 may provide a function through the API 360 so that the application 370 can effectively use a limited system resource in the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module used by a compiler to add a new function through a programming language while the application 370 is executed. According to various embodiments of the present disclosure, the runtime library 335 may perform an operation of an input/output, a memory management, an arithmetic function, and/or the like.

The application manager 341 may manage a life cycle of at least one application among the applications 370. The window manager 342 may manage a Graphic User Interface (GUI) resource used in a screen. The multimedia manager 343 may recognize a format required to reproduce various media files, and may use a code suitable for the format to perform encoding or decoding of the media file. The resource manager 344 may manage a resource (e.g., a source code, a memory, a storage space, and/or the like) of at least any one of the applications 370.

The power manager 345 may manage a battery or power by operating together with a Basic Input/Output System (BIOS), and/or the like, and may provide power information, and/or the like, required for the operation. The database manager 346 may manage to generate, search, or change a database to be used in at least one application among the applications 370. The package manager 347 may manage an installation or update of an application distributed in a form of a package file.

The connectivity manager 348 may manage a wireless connection such as WiFi, Bluetooth, and/or the like. The notification manager 349 may display or notify an event such as an incoming message, an appointment, a proximity notification, and/or the like, in a manner that does not disturb (e.g., significantly disturb) the user. The location manager 350 may manage location information of the electronic device. The graphic manager 351 may manage a graphic effect to be provided to the user or a user interface related thereto. The security manager 352 may provide a general security function required for system security, user authentication, and/or the like. According to various embodiments of the present disclosure, if the electronic device (e.g., the electronic device 100) has a telephone function, the middleware 330 may further include a telephony manager (not shown) for managing a voice or video telephony function of the electronic device.

The middleware 330 may generate and use a new middleware module by combining various functions of the aforementioned internal constitutional modules. The middleware 330 may provide a module specified for each type of operating system to provide a differentiated function. In addition, the middleware 330 may dynamically delete some of the existing constitutional elements or may add new constitutional elements. Therefore, according to various embodiments of the present disclosure, some of the constitutional elements described herein may be omitted, or other constitutional elements may be further included or may be replaced with constitutional elements having other names for performing a similar function.

The API 360 (e.g., the API 133) is a set of API programming functions, and may be provided with other configurations according to an operating system. For example, in case of Android or IOS, one API set may be provided for each platform, and in case of Tizen, two or more API sets may be provided.

The application 370 (e.g., the application 134) may include a preloaded application or a third party application. The application 370 may include a home application 371, a dialer application 372, a Short Messaging System (SMS) or Multimedia Messaging System (MMS) application 373, an Instant Messaging (IM) application 374, a browser application 375, a camera application 376, an alarm application 377, a contacts application 378, a voice dial application 379, an email application 380, a calendar application 381, a media player application 382, an album application 383, a clock application 384, and/or the like.

At least some parts of the programming module 300 may be implemented with an instruction stored in a non-transitory computer-readable storage media. If the instruction is executed by one or more processors (e.g., the processor 210), then the one or more processors may perform a function corresponding to the instruction. The non-transitory computer-readable storage media may be the memory 260. At least some parts of the programming module 300 may be implemented (e.g., executed) by the processor 210. At least some parts of the programming module 300 may include modules, programs, routines, sets of instructions, processes, and/or the like, for performing one or more functions.

Names of constitutional (e.g., internal) elements of the programming module (e.g., the programming module 300) according to various embodiments of the present disclosure may vary depending on a type of operating system. In addition, the programming module according to various embodiments of the present disclosure may further include at least one or more constitutional (e.g., internal) elements among the aforementioned constitutional (e.g., internal) elements, or some of the constitutional (e.g. internal) elements may be omitted, or additional other constitutional (e.g. internal) elements may be further included.

Figure 4:
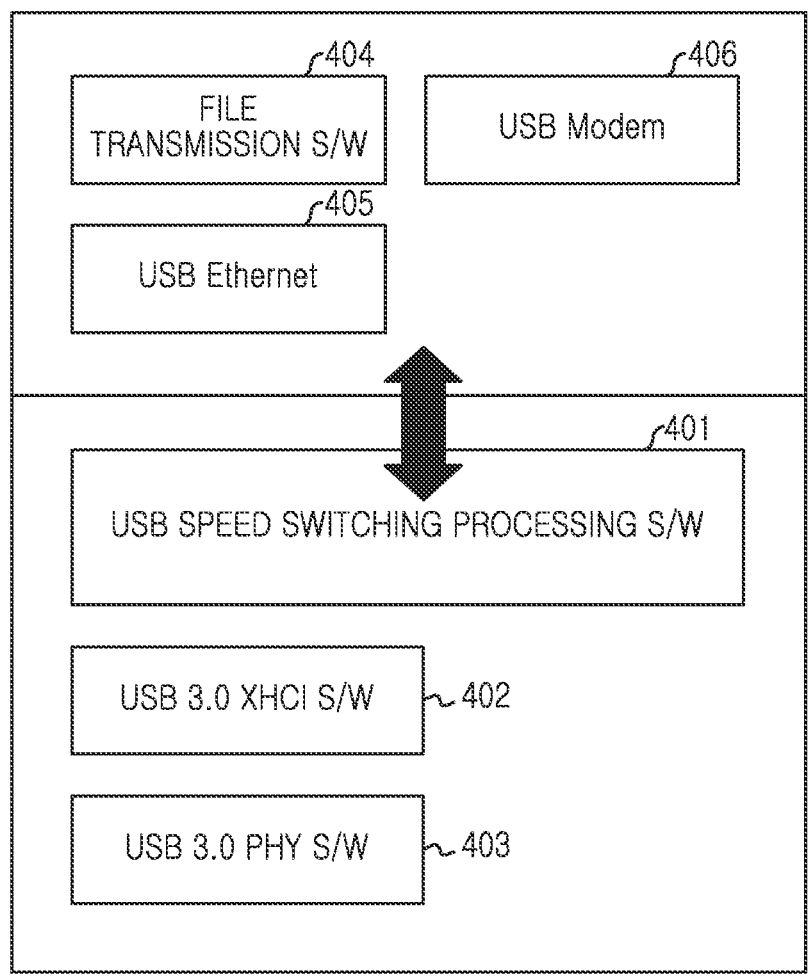
FIG. 4 illustrates a software structure of a host electronic device according to an embodiment of the present disclosure.

FIG. 4 illustrates a SoftWare (S/W) structure of a host electronic device according to an embodiment of the present disclosure.

Referring to FIG. 4, according to various embodiments of the present disclosure, the S/W of the host electronic device may include a USB/MHL speed switch processing API 401, a USB/MHL 3.0 eXtensible Host Controller Interface (XHCI) S/W 402, a USB/MHL 3.0 physical (PHY) S/W 403, a file transmission S/W 404, a USB/MHL Ethernet 405, a USB/MHL modem 406, and/or the like.

Herein, the host electronic device may be an electronic device capable of controlling another electronic device connected thereto. For example, if a Personal Computer (PC) and a terminal are connected, the PC may be the host electronic device as an electronic device capable of controlling the terminal, and the terminal may be the other electronic device as an electronic device controllable by the PC. For another example, if the terminal is connected to a camera, the terminal may be the host electronic device as an electronic device capable of controlling the camera, and the camera may be the other electronic as an electronic device controllable by the terminal. Hereinafter, each of constitutional elements that can be constructed in the host electronic device will be described.

First, the USB/MHL speed switch processing API 401 may be a practical S/W for performing the USB/MHL speed processing. More specifically, the USB/MHL speed switch processing API 401 may transmit/receive data with respect to another electronic device by using any one of a USB 3.0 interface and a USB 2.0 interface, and may transmit/receive data with respect to another electronic device by using any one of an MHL 3.0 interface and an MHL 2.0 interface. For example, the USB/MHL speed switch processing API 401 may switch the USB/MHL interface from the USB/MHL 3.0 to the USB/MHL 2.0 or from the USB/MHL 2.0 to the USB/MHL 3.0. Herein, the USB/MHL speed switch processing API 401 may have various algorithms for automatic speed switching.

The USB/MHL 3.0 XHCI S/W 402 is a driver for implementing an operation with a USB/MHL 3.0 protocol, and may differ for each operating system according to an implementation.

The USB/MHL 3.0 PHY S/W 403 may be a driver S/W for controlling a physical part of a USB/MHL 3.0 chip.

The file transmission S/W 404 may be a S/W module capable of performing file transmission by using the USB/MHL similarly to an explorer included in the electronic device.

The USB/MHL Ethernet 405 may be a S/W capable of exchanging data through a network.

The USB/MHL modem 406 may be a modem S/W for processing a phone call, a data communication, an SMS/MMS, and/or the like. In addition, the USB/MHL modem

406 may provide information such as strength/weakness of an antenna signal, and/or the like, to the electronic device.

Figure 5:
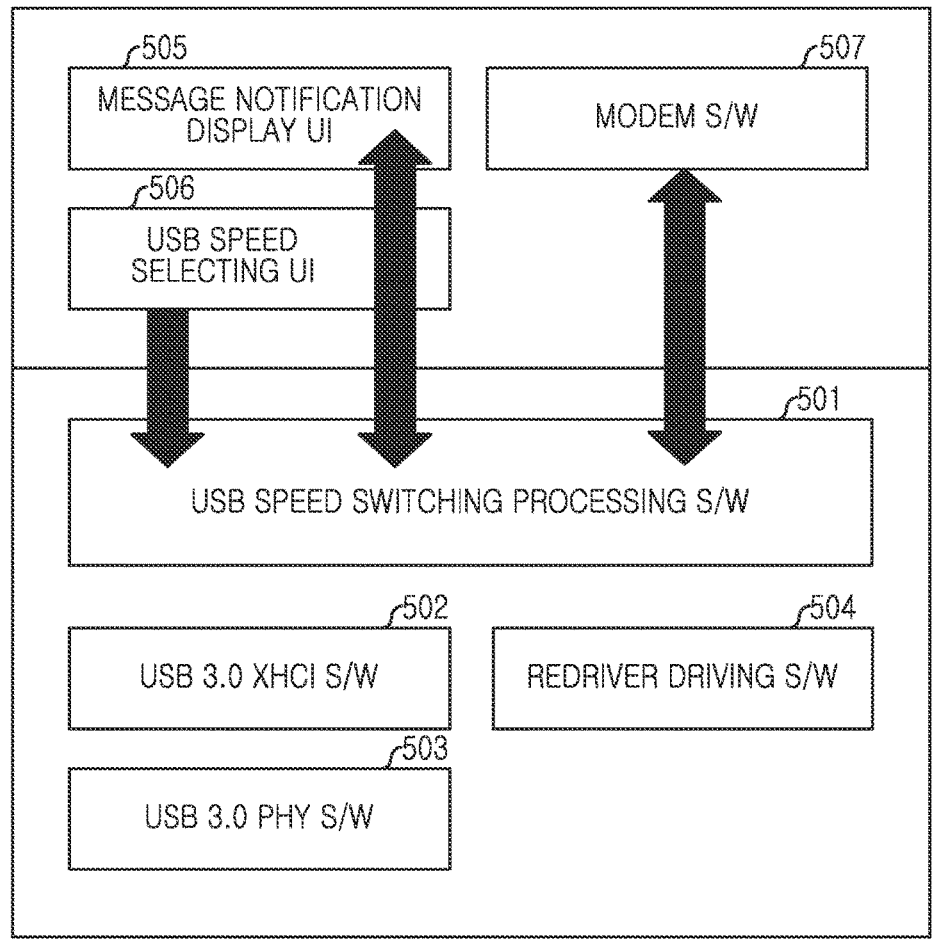
FIG. 5 illustrates a software structure of another electronic device according to an embodiment of the present disclosure.

FIG. 5 illustrates a S/W structure of another electronic device according to an embodiment of the present disclosure.

Referring to FIG. 5, according to various embodiments of the present disclosure, the S/W of the other electronic device may include a USB/MHL speed switching processing S/W 501, a USB/MHL 3.0 XHCI S/W 502, a USB/MHL 3.0 PHY S/W 503, a redriver driving S/W 504, a message notification display User Interface (UI) 505, a USB/MHL speed selecting UI 506, and a modem S/W 507. Herein, the other electronic device may be an electronic device controllable by a host electronic device connected thereto. Hereinafter, each of constitutional elements that can be constructed in the other electronic device will be described.

First, the USB/MHL speed switching processing S/W 501 may be a practical S/W for performing the USB/MHL speed processing. For example, as illustrated in FIG. 5, the USB/MHL speed switching processing S/W 501 may control a USB/MHL transmission speed by transmitting/receiving data with respect to the USB/MHL 3.0 XHCI S/W 502, the USB/MHL 3.0 PHY S/W 503, the redriver driving S/W 504, the message notification display UI 505, the USB/MHL speed selecting UI 506, and the modem S/W 507. For example, the USB/MHL speed switching processing S/W 501 may switch to any one of a USB 3.0 interface and a USB 2.0 interface, or may switch to any one of an MHL 3.0 interface and an MHL 2.0 interface.

The USB/MHL 3.0 XHCI S/W 502 is a driver for implementing an operation with a USB/MHL 3.0 protocol, and may differ for each operating system according to an implementation. For example, as illustrated in FIG. 5, the USB/MHL 3.0 XHCI S/W 502 may allow the electronic device to control the USB/MHL transmission speed, by transmitting/receiving data with respect to the USB/MHL speed switching processing S/W 501.

The USB/MHL 3.0 PHY S/W 503 may be a driver S/W for controlling a physical part of a USB/MHL 3.0 chip. For example, the USB/MHL 3.0 PHY S/W 503 may transmit data controlled by the USB/MHL speed switching processing S/W 501, by controlling the physical part of the USB/MHL 3.0 chip. In addition, if the electronic device does not have a redriver, the USB/MHL 3.0 PHY S/W 503 may optionally receive a register value to operate with the USB/MHL 2.0.

The redriver driving S/W 504 may be a S/W module for driving a redriver for correcting a USB/MHL 3.0 signal. For example, if the electronic device has the USB/MHL 3.0 redriver, the electronic device may optionally disable the redriver to operate with the USB/MHL 2.0 interface.

The message alarm display UI 505 is a UI for displaying a current USB/MHL transmission speed, and may transmit differentiated data to a display module of the electronic device so that the USB/MHL 2.0 and the USB/MHL 3.0 are distinctively displayed. For example, if the electronic device is changed to an environment of using the USB 2.0 interface while using the USB 3.0 interface, the message alarm display UI 505 may transmit data to the display module to display information indicating the switching from the USB 3.0 interface to the USB 2.0 interface. Likewise, if the electronic device is changed to an environment of using the MHL 2.0 interface while using the MHL 3.0 interface, the message alarm display UI 505 may transmit data to the display module to display information indicating the switching from the MHL 3.0 interface to the MHL 2.0 interface.

The USB/MHL speed selecting UI 506 may be a UI capable of inputting any one of the USB/MHL 3.0 interface and the USB/MHL 2.0 interface. For example, the USB speed selecting UI 506 may display a message capable of selecting the USB transmission speed, and thereafter may select any one of speed selection buttons included in the displayed message. In addition, if the electronic device is configured to be automatically switched according to a communication environment in which the USB/MHL speed is set, the USB/MHL speed selecting UI 506 may display the changed USB/MHL transmission speed whenever the USB/MHL speed is changed.

The modem S/W 507 may be a S/W module for processing a phone call, a data communication, an SMS/MMS, and/or the like. In addition, the modem S/W 507 may provide information such as strength/weakness of an antenna signal, and/or the like, to the electronic device.

Figure 6:
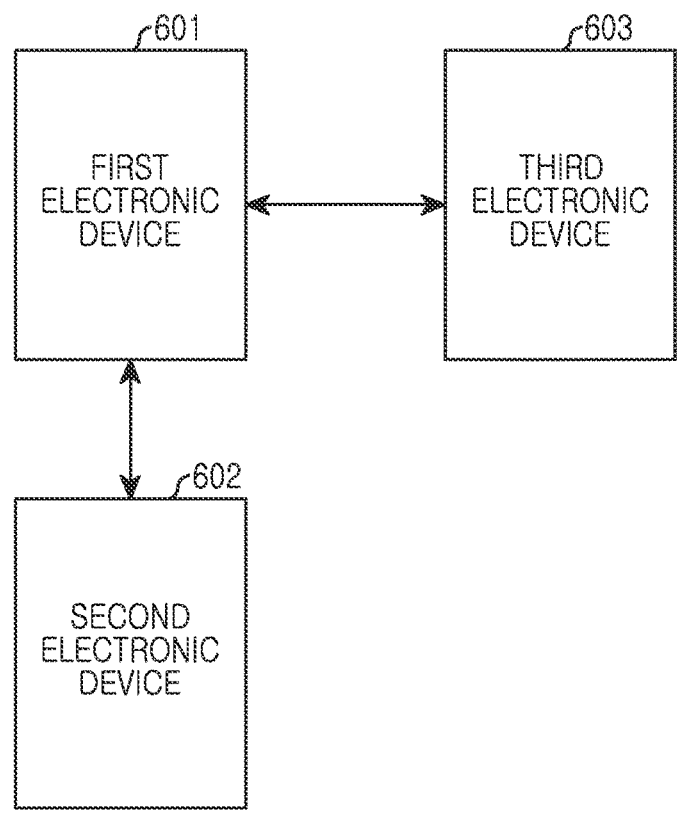
FIG. 6 illustrates an example of controlling a state of data communication currently performed with a second electronic device on a basis of a communication state with a third electronic device according to an embodiment of the present disclosure.

FIG. 6 illustrates an example of controlling a state of data communication currently performed with a second electronic device on a basis of a communication state with a third electronic device according to an embodiment of the present disclosure.

Referring to FIG. 6, a first electronic device 601 may detect a connection with a second electronic device 602 via a USB 3.0 port. More particularly, the first electronic device 601 may detect the second electronic device 602 connected to transmit/receive data via the USB 3.0 port included in the first electronic device 601.

Thereafter, the first electronic device 601 may perform a communication with a third electronic device 603 in a state of being connected to the second electronic device 602. For example, the first electronic device 601 may perform a phone call with the third electronic device 603 in a state in which data is transmitted/received with respect to the second electronic device 602, or may perform a wireless communication for transmitting/receiving a text message, and/or the like.

Thereafter, the first electronic device 601 may determine whether a communication state with the third electronic device 603 is any one of a determined first communication state and a determined second communication state. Herein, the first communication state may be a communication state in which a signal of a data network is detected with an electric field greater than or equal to a determined electronic field and a communication state in which the signal of the data network has never failed to be detected. In addition, the second communication state may be at least one of a communication state in which a signal of a data network is detected with an electric field less than a determined electronic field and a communication state in which the signal of the data network has failed to be detected.

If the first electronic device 601 determines that the communication state with the third electronic device 603 is the determined second communication state, the first electronic device 601 may switch the USB 3.0 interface to the USB 2.0 interface, and thereafter may transmit/receive data with respect to the second electronic device 602. More specifically, if the first electronic device 601 is determined as at least one of the communication state in which a signal of a data network is detected with an electric field less than a determined electronic field and the communication state in which the signal of the data network has failed to be detected, the first electronic device 601 may switch the USB 3.0 interface to the USB 2.0 interface, and thereafter may transmit/receive data with respect to the second electronic device 602. According to various embodiments of the present disclosure, in the aforementioned case, the first data communication may be USB (3.0/2.0) or MHL (2.0/1.0), and the second data communication may be a wireless data communication. However, if the first electronic device 601 determines that the communication state with the third electronic device 603 is the determined first communication state, the first electronic device 601 may transmit/receive data with respect to the second electronic device 602 without having to switch the USB 3.0 interface to the USB 2.0 interface. More specifically, if the first electronic device 601 is determined as a communication state in which a signal of a data network with the third electronic device 603 is detected with an electric field greater than or equal to a determined electric field and as a communication state in which the signal of the data network has never failed to be detected, the first electronic device 601 may transmit/receive data with respect to the second electronic device 602 without having to switch the USB 3.0 interface to the USB 2.0 interface.

As another example, the first electronic device 601 may detect a connection with the second electronic device 602 via the MHL 3.0 port. More specifically, the first electronic device 601 may detect the second electronic device 602 connected to transmit/receive data via the MHL 3.0 port included in the first electronic device 601.

Thereafter, the first electronic device 601 may perform a communication with a third electronic device 603 in a state of being connected to the second electronic device 602. For example, the first electronic device 601 may perform a phone call with the third electronic device 603 in a state in which data is transmitted/received with respect to the second electronic device 602, or may perform a wireless communication for transmitting/receiving a text message, and/or the like.

Thereafter, the first electronic device 601 may determine whether a communication state with the third electronic device 603 is any one of a determined first communication state and a determined second communication state. Herein, the first communication state may be a communication state in which a signal of a data network is detected with an electric field greater than or equal to a determined electronic field and a communication state in which the signal of the data network has never failed to be detected. In addition, the second communication state may be at least one of a communication state in which a signal of a data network is detected with an electric field less than a determined electronic field and a communication state in which the signal of the data network has failed to be detected.

If the first electronic device 601 determines that the communication state with the third electronic device 603 is the determined second communication state, then the first electronic device 601 may switch the MHL 3.0 interface to the MHL 2.0 interface, and thereafter may transmit/receive data with respect to the second electronic device 602. More specifically, if the first electronic device 601 is determined as at least one of the communication state in which a signal of a data network is detected with an electric field less than a determined electronic field and the communication state in which the signal of the data network has failed to be detected, then the first electronic device 601 may switch the MHL 3.0 interface to the MHL 2.0 interface, and thereafter may transmit/receive data with respect to the second electronic device 602.

However, if the first electronic device 601 determines that the communication state with the third electronic device 603 is the determined first communication state, then the first electronic device 601 may transmit/receive data with respect to the second electronic device 602 without having to switch the MHL 3.0 interface to the MHL 2.0 interface. More specifically, if the first electronic device 601 is determined as a communication state in which a signal of a data network with the third electronic device 603 is detected with an electric field greater than or equal to a determined electric field and as a communication state in which the signal of the data network has never failed to be detected, then the first electronic device 601 may transmit/receive data with respect to the second electronic device 602 without having to switch the MHL 3.0 interface to the MHL 2.0 interface.

Figure 7:
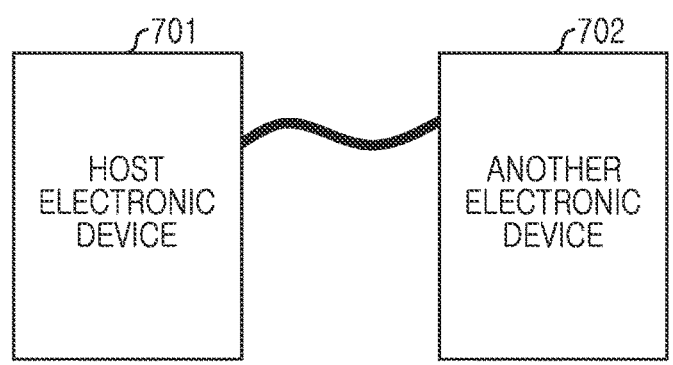
FIG. 7 illustrates an example of switching a Universal Serial Bus (USB) interface when a host electronic device and another electronic device are connected according to an embodiment of the present disclosure.

FIG. 7 illustrate an example of switching a USB interface when a host electronic device and another electronic device are connected according to an embodiment of the present disclosure.

Referring to FIG. 7, an operation order of the host electronic device will be described in greater detail under the assumption that the host electronic device is an electronic device having a function capable of switching the USB interface according to various embodiments of the present disclosure and the other electronic device is an electronic device not having the function capable of switching the USB interface.

As illustrated in FIG. 7, the host electronic device 701 may be operatively connected with another electronic device 702.

The host electronic device 701 may detect a connection with the other electronic device 702 (e.g., another electronic device) via a USB 3.0 port. More particularly, the host electronic device 701 may detect the other electronic device 702 connected to transmit/receive data via the USB 3.0 port included in the host electronic device 701.

The host electronic device 701 may detect that the other electronic device 702 does not have a function capable of switching from a USB 3.0 interface to a USB 2.0 interface. For example, the host electronic device 701 may detect that the other electronic device 702 does not have a function capable of switching from the USB 3.0 interface to the USB 2.0 interface or switching from the USB 2.0 interface to the USB 3.0 interface.

The host electronic device 701 may determine whether a data amount to be transmitted/received with respect to the other electronic device 702 is greater than or equal to a determined data amount. More specifically, the host electronic device 701 may determine whether a data amount to be transmitted/received with respect to the other electronic device 702 is a great amount which is greater than or equal to a determined data amount or is a small amount which is less than the determined data amount.

If the host electronic device 701 determines that the data amount to be transmitted/received with respect to the other electronic device 702 is greater than or equal to the determined data amount, then the host electronic device 701 may transmit/receive data with respect to the other electronic device 702 by using the USB 3.0 interface. More specifically, if the host electronic device 701 is configured to use the USB 2.0 interface as a default value when transmitting/receiving data with respect to the other electronic device 702, then, because the host electronic device 701 may transmit/receive a great amount of data with respect to the other electronic device 702, the host electronic device 701 may switch from the USB 2.0 interface to the USB 3.0 interface and thereafter may transmit/receive data with respect to the other electronic device 702.

Otherwise, if the host electronic device 701 determines that the data amount to be transmitted/received with respect to the other electronic device 702 is less than the determined data amount, then the host electronic device 701 may transmit/receive data with respect to the other electronic device 702 by using the USB 2.0 interface. More specifically, because the host electronic device 701 may transmit/receive a small amount of data with respect to the other electronic device 702, telephony quality (e.g., communication quality) of the other electronic device 702 may be improved by using the USB 2.0 interface instead of using the USB 3.0 interface having a fast data processing speed. For example, if the other electronic device 702 is currently communicating with a different electronic device, then, because the other electronic device 702 does not have a function capable of switching the USB interface, the host electronic device 701 may continuously maintain the USB 2.0 interface determined as a default value, thereby controlling a communication error which occurs when the other electronic device 702 communicates with the different electronic device.

In the aforementioned operation, the host electronic device 701 is configured to automatically switch the USB interface. The host electronic device 701 may also manually switch the USB interface by receiving a user input.

Figure 8:
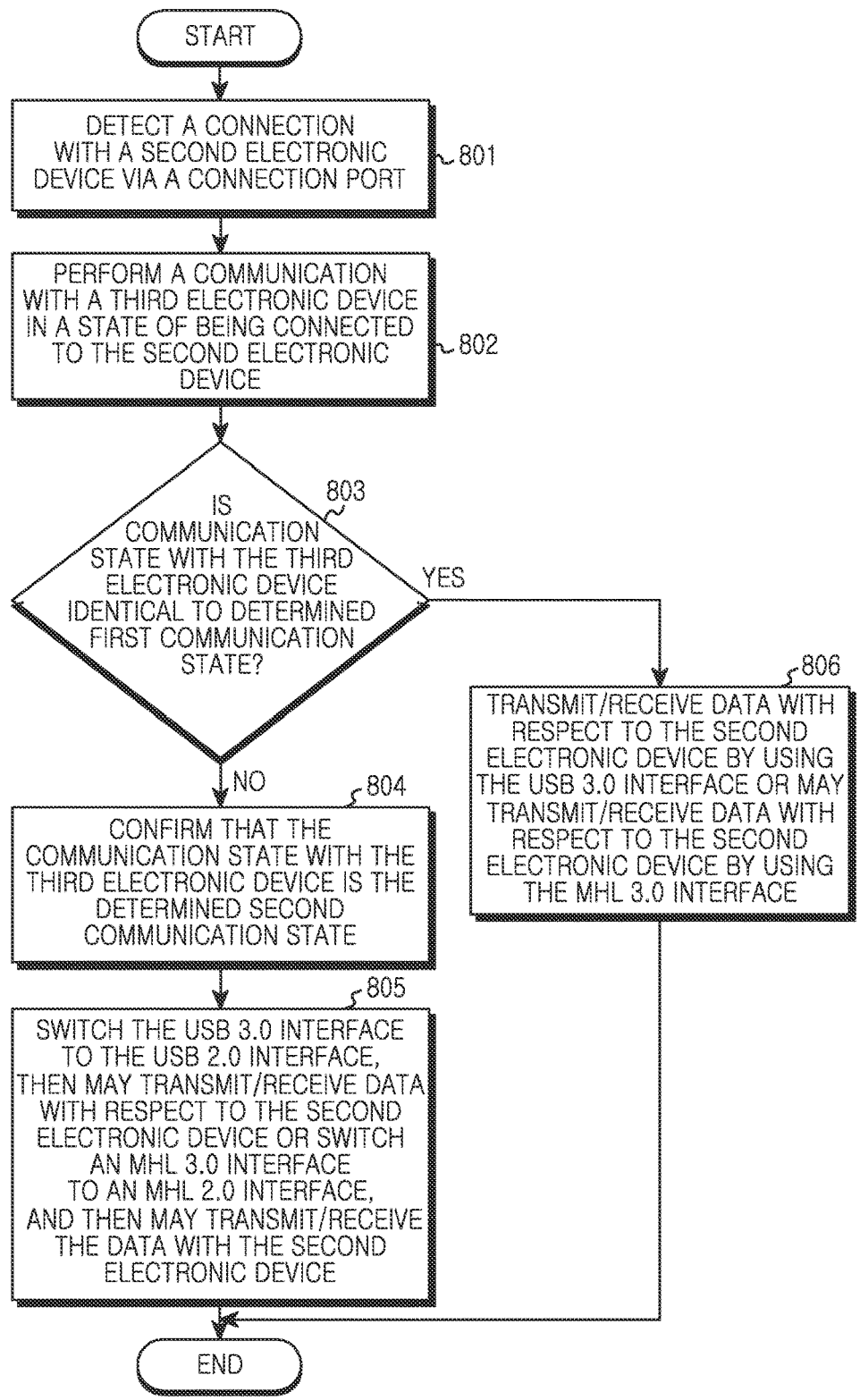
FIG. 8 is a flowchart illustrating an operation of a first electronic device according to a first embodiment of the present disclosure.

FIG. 8 is a flowchart illustrating an operation of a first electronic device according to a first embodiment of the present disclosure.

At operation 801, the first electronic device may detect a connection with a second electronic device via a connection port. More specifically, the first electronic device may detect the second electronic device connected to transmit/receive data via a USB/MHL 3.0 port included in the first electronic device.

At operation 802, the first electronic device may perform a communication with a third electronic device in a state of being connected to the second electronic device. For example, the first electronic device may perform a telephony communication with the third electronic device in a state in which data is transmitted/received with respect to the second electronic device, or may perform a wireless communication for transmitting/receiving a text message, and/or the like.

At operation 803, the first electronic device may determine whether a communication state with the third electronic device is a determined first communication state. More specifically, the first electronic device may determine whether the communication state with the third electronic device is any one of the determined first communication state and a determined second communication state. Herein, the first communication state may be a communication state in which a signal of a data network is detected with an electric field greater than or equal to a determined electric field. According to various embodiments of the present disclosure, the first communication state may be determined by strength of an electric field received as a Received Signal Strength Indicator (RSSI) value, and/or the like. In addition, the second communication state may be at least one of a communication in which a signal of a data network is detected with an electric field less than a determined electric field and a communication state in which the signal of the data network has failed to be detected.

If the first electronic device determines that the communication with the third electronic device is not the determined first communication state at operation 803, then the first electronic device may proceed to operation 804 at which the first electronic device may confirm that the communication state with the third electronic device is the determined second communication state. More specifically, the first electronic device may determine the communication state with the third electronic device is at least one of the communication state in which a signal of a data network is detected with an electric field less than a determined electric field and the communication state in which a signal of a data network has failed to be detected.

Thereafter, at operation 805, the first electronic device may switch the USB 3.0 interface to the USB 2.0 interface, then the first electronic device may transmit/receive data with respect to the second electronic device or switch an MHL 3.0 interface to an MHL 2.0 interface, and then may transmit/receive the data with the second electronic device. More specifically, the first electronic device may switch the USB 3.0 interface determined as a default value to the USB 2.0 interface, and thus may avoid a communication error which occurs while performing a communication with the third electronic device. In addition, the first electronic device may switch the MHL 3.0 interface determined as a default value to the MHL 2.0 interface and thus may perform a data communication with the second electronic device.

In contrast, if the first electronic device determines that the communication state with the third electronic device is the first communication state at operation 803, then the first electronic device may proceed to operation 806 at which the first electronic device may transmit/receive data with respect to the second electronic device by using the USB 3.0 interface or may transmit/receive data with respect to the second electronic device by using the MHL 3.0 interface. More specifically, if the first electronic device determines the communication state with the third electronic device as a reliable communication state, then the first electronic device may use the USB 3.0 interface or MHL 3.0 interface determined as a default value to transmit/receive data with the second electronic device at a fast speed.

Figure 9:
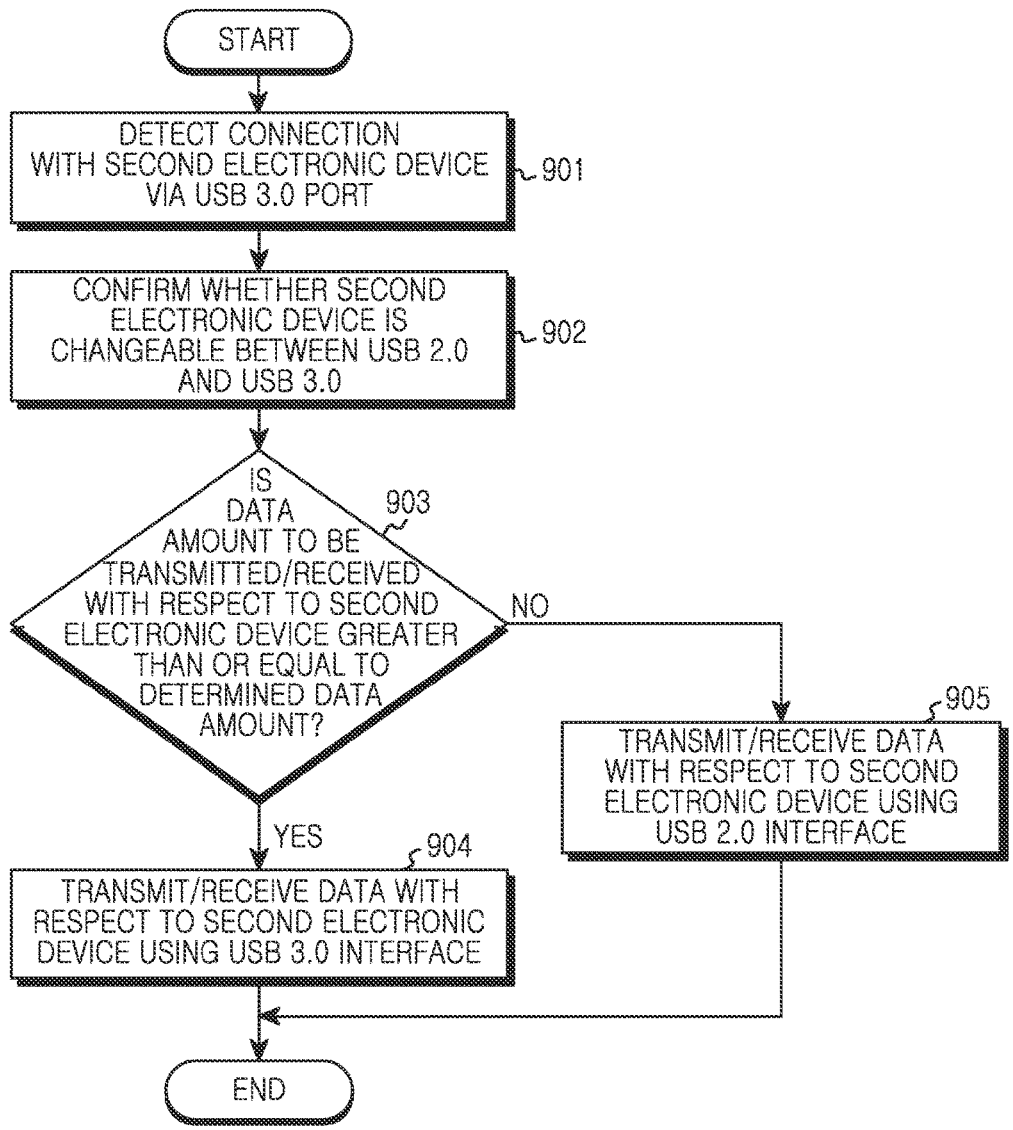
FIG. 9 is a flowchart illustrating an operation of controlling another electronic device not having a USB interface switch function in a host electronic device having a USB interface switch function according to an embodiment of the present disclosure.

FIG. 9 is a flowchart illustrating an operation of controlling a device electronic device not having a USB interface switch function in a host electronic device having a USB interface switch function according to an embodiment of the present disclosure. Hereinafter, for convenience of explanation, the host electronic device is called a first electronic device, and the other electronic device is called a second electronic device.

At operation 901, the first electronic device may detect a connection with the second electronic device via a USB 3.0 port. More specifically, the first electronic device may detect the connected second electronic device to transmit/receive data via the USB 3.0 port included in the first electronic device.

At operation 902, the first electronic device may confirm whether the second electronic device is changeable between USB 2.0 and USB 3.0.

At operation 903, the first electronic device may determine whether a data amount to be transmitted/received with respect to the second electronic device is greater than or equal to a determined data amount. More specifically, the first electronic device may determine whether a data amount to be transmitted/received with respect to the second electronic device is a great amount which is greater than or equal to a determined data amount or is a small amount which is less than the determined data amount.

If the first electronic device determines that the data amount to be transmitted/received with respect to the second electronic device is greater than or equal to the determined data amount at operation 903, then the first electronic device proceeds to operation 904 at which the first electronic device may transmit/receive data with respect to the second electronic device by using the USB 3.0 interface. More specifically, if the first electronic device is configured to use the USB 2.0 interface as a default value when transmitting/receiving data with respect to the second electronic device, then, because the first electronic device may transmit/receive a great amount of data with respect to the second electronic device, the first electronic device may switch from the USB 2.0 interface to the USB 3.0 interface and thereafter may transmit/receive data with respect to the second electronic device.

In contrast, if the first electronic device determines that the data amount to be transmitted/received with respect to the second electronic device is less than the determined data amount at operation 903, then the first electronic device proceeds to operation 905 at which the first electronic device may transmit/receive data with respect to the second electronic device by using the USB 2.0 interface. More specifically, because the first electronic device may transmit/receive a small amount of data with respect to the second electronic device, telephony quality of the second electronic device may be improved by using the USB 2.0 interface instead of using the USB 3.0 interface having a fast data processing speed.

Figure 10:
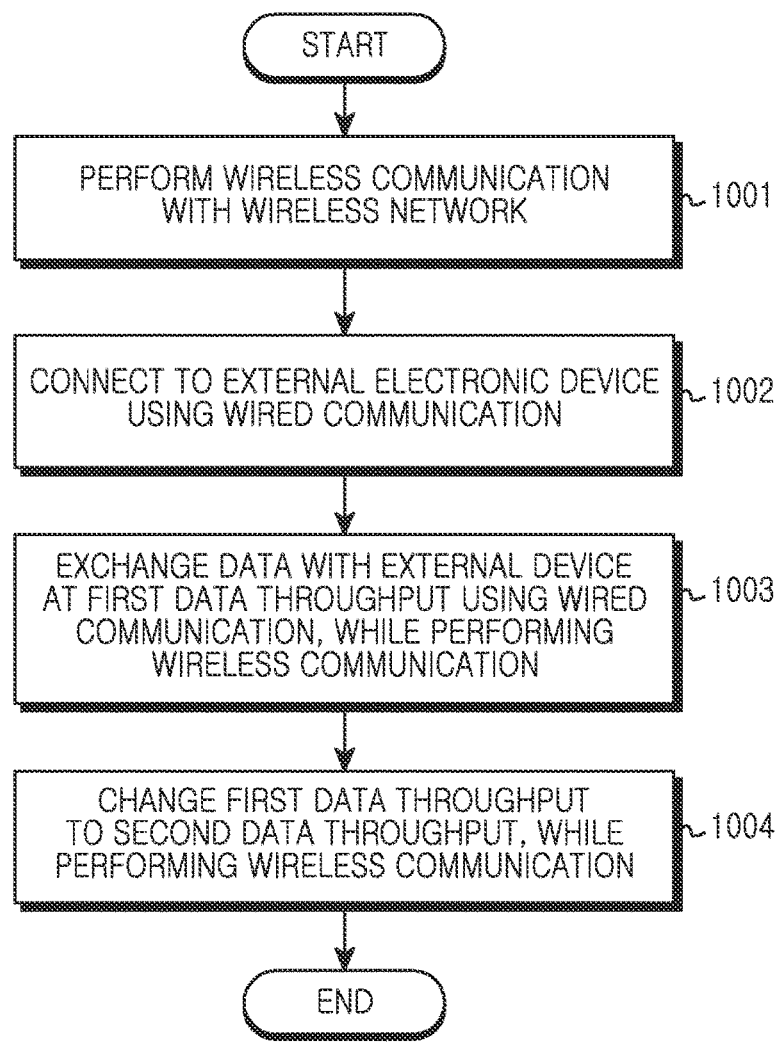
FIG. 10 is a flowchart illustrating a first method of an electronic device according to various embodiments of the present disclosure.

FIG. 10 is a flowchart illustrating a first method of an electronic device according to various embodiments of the present disclosure.

At operation 1001, the electronic device may perform a wireless communication with a wireless network.

At operation 1002, the electronic device may connect to an external electronic device by using a wired communication.

At operation 1003, the electronic device may exchange data with an external device at a first data throughput using the wired communication, while performing the wireless communication.

At operation 1004, the electronic device may change the first data throughput to a second data throughput, while performing the wireless communication.

Figure 11:
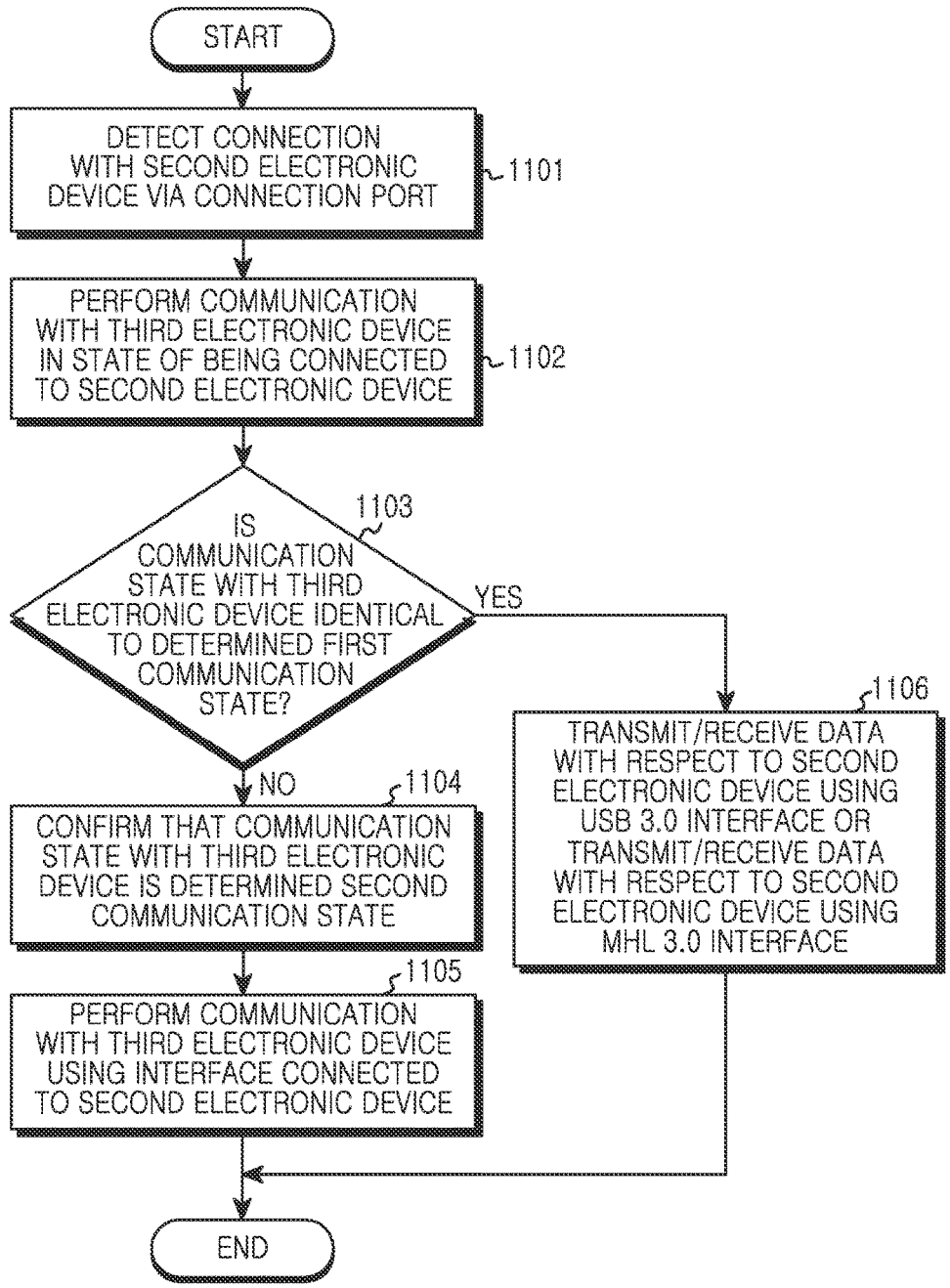
FIG. 11 is a flowchart illustrating an operation of a first electronic device according to a second embodiment of the present disclosure.

FIG. 11 is a flowchart illustrating an operation of a first electronic device according to a second embodiment of the present disclosure.

At operation 1101, the first electronic device may detect a connection with a second electronic device via a connection port. More specifically, the first electronic device may detect the second electronic device connected to transmit/receive data via a USB/MHL 3.0 port included in the first electronic device.

At operation 1102, the first electronic device may perform a communication with a third electronic device in a state of being connected to the second electronic device. For example, the first electronic device may perform a telephony communication with the third electronic device in a state in which data is transmitted/received with respect to the second electronic device, or may perform a wireless communication for transmitting/receiving a text message, and/or the like.

At operation 1103, the first electronic device may determine whether a communication state with the third electronic device is a determined first communication state. More specifically, the first electronic device may determine whether the communication state with the third electronic device is any one of the determined first communication state and a determined second communication state. Herein, the first communication state may be a communication state in which a signal of a data network is detected with an electric field greater than or equal to a determined electric field. According to various embodiments of the present disclosure, the first communication state may be determined by strength of an electric field received as a RSSI value. In addition, the second communication state may be at least one of a communication in which a signal of a data network is detected with an electric field less than a determined electric field and a communication state in which the signal of the data network has failed to be detected.

If the first electronic device determines that the communication state with the third electronic device is the first communication state at operation 1104, then the first electronic device may proceed to operation 1104 at which the first electronic device may confirm that the communication state with the third electronic device is the determined second communication state. More specifically, the first electronic device may determine the communication state with the third electronic device is at least one of the communication state in which a signal of a data network is detected with an electric field less than a determined electric field and the communication state in which a signal of a data network has failed to be detected.

Thereafter, at operation 1105, the first electronic device may perform a communication with the third electronic device by using an interface connected to the second electronic device. According to various embodiments of the present disclosure, the first electronic device may perform a communication with the third electronic device via a USB Ethernet in a state in which a communication state with the second electronic device is maintained to the USB 3.0 interface.

If the first electronic device determines that the communication state with the third electronic device is the first communication state at operation 1103, then the first electronic device may proceed to operation 1106 at which the first electronic device may transmit/receive data with respect to the second electronic device by using the USB 3.0 interface or may transmit/receive data with respect to the second electronic device by using the MHL 3.0 interface. More specifically, if the first electronic device determines the communication state with the third electronic device as a reliable communication state, then the first electronic device may use the USB 3.0 interface or MHL 3.0 interface determined as a default value to transmit/receive data with the second electronic device at a fast speed.

Figure 12:
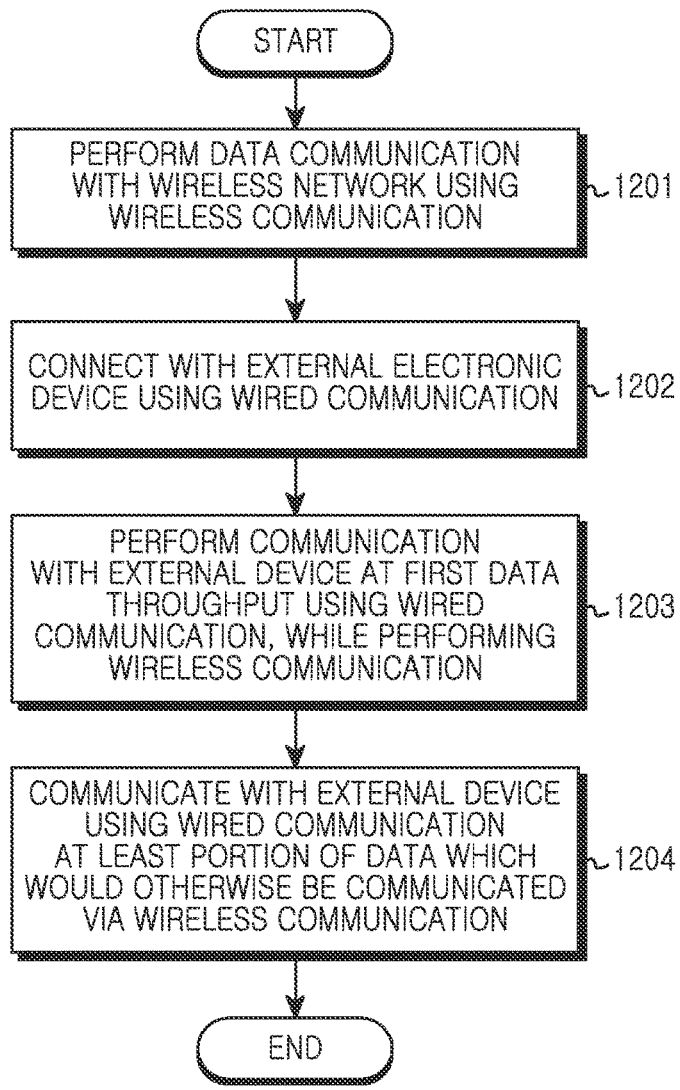
FIG. 12 is a flowchart illustrating a second method of an electronic device according to various embodiments of the present disclosure.

FIG. 12 is a flowchart illustrating a second method of an electronic device according to various embodiments of the present disclosure.

At operation 1201, the electronic device may perform a data communication with a wireless network by using wireless communication.

At operation 1202, the electronic device may connect to an external electronic device, by using a wired communication.

At operation 1203, the electronic device may perform a communication with the external device at a first data throughput by using the wired communication, while performing the wireless communication.

At operation 1204, the electronic device may communicate with the external device by using the wired communication at least a portion of the data which would otherwise be communicated via the wireless communication.

Figure 13:
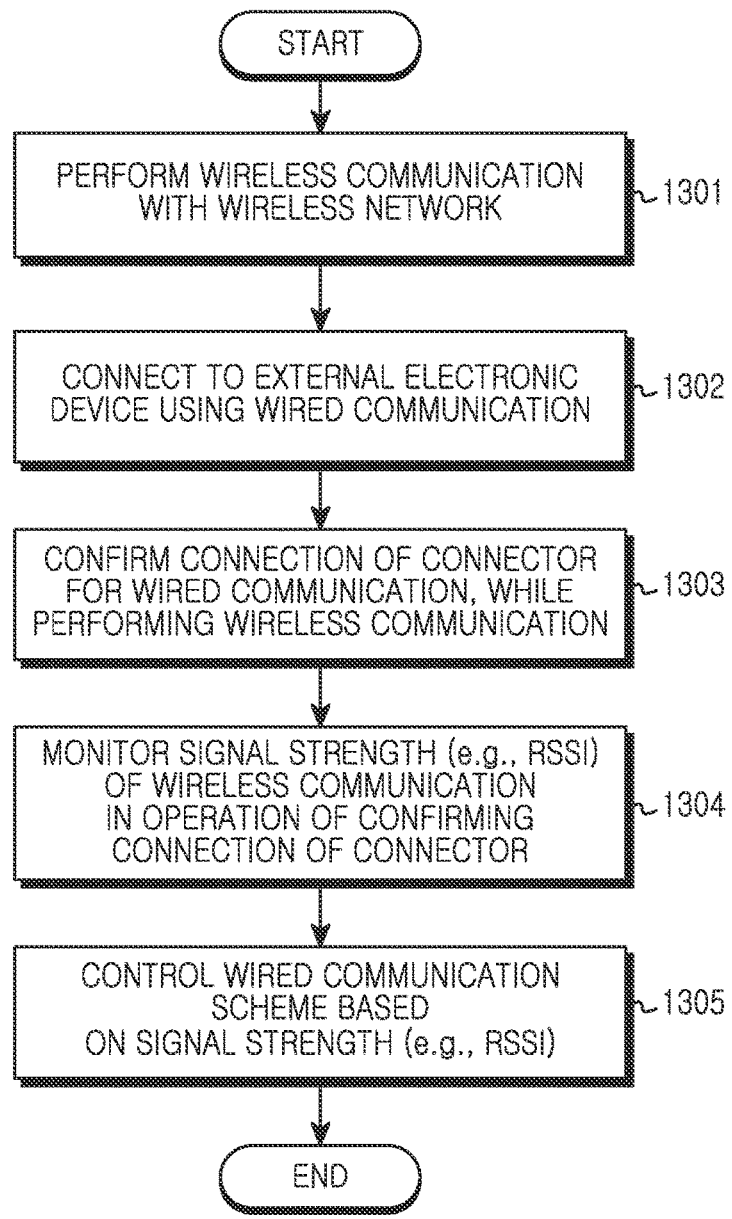
FIG. 13 is a flowchart illustrating a third method of an electronic device according to various embodiments of the present disclosure.

FIG. 13 is a flowchart illustrating a third method of an electronic device according to various embodiments of the present disclosure.

At operation 1301, the electronic device may perform a wireless communication with a wireless network.

At operation 1302, the electronic device may connect to an external electronic device by using a wired communication.

At operation 1303, the electronic device may confirm a connection of a connector for the wired communication, while performing the wireless communication.

At operation 1304, the electronic device may monitor signal strength of the wireless communication.

At operation 1305, the electronic device may control a wired communication scheme, on the basis of the signal strength (e.g., RSSI).

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random-Access Memory (RAM), memory chips, device or integrated circuits or on an optically or magnetically readable medium such as, for example, a CD, DVD, magnetic disk or magnetic tape or the like. It will be appreciated that the storage devices and storage media are various embodiments of machine-readable storage that are suitable for storing a program or programs comprising instructions that, when executed, implement various embodiments of the present disclosure.

Accordingly, various embodiments provide a program comprising code for implementing apparatus or a method as claimed in any one of the claims of this specification and a non-transitory machine-readable storage storing such a program. Still further, such programs may be conveyed electronically via any medium such as a communication signal carried over a wired or wireless connection and various embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device comprising a redriver integrated circuit (IC), the method comprising:
    communicating data with a wireless network using a wireless communication;
    connecting to an external electronic device using a wired communication;
    exchanging data with the external electronic device at a first data throughput using the wired communication while performing the wireless communication;
    disabling the redriver IC to change the first data throughput to a second data throughput while performing the wireless communication;
    when the first data throughput is changed to the second data throughput, displaying information on the second data throughput; and
    if the redriver IC is enabled, exchanging data with the external electronic device at the first data throughput,
    wherein the redriver IC is configured to correct a signal used to exchange data with the external electronic device at the first data throughput.

2. The method of claim 1, wherein the performing of the wireless communication includes an operation of using a long term evolution (LTE) communication protocol.

3. The method of claim 1, wherein the second data throughput is less than the first data throughput.

4. The method of claim 1,
    wherein the exchanging of the data at the first throughput includes an operation of using a universal serial bus (USB) 3.0 protocol, and
    wherein the changing of the first data throughput to the second data throughput includes an operation of changing from a state of using the USB 3.0 protocol to a state of using a USB 2.0 protocol.

5. The method of claim 1,
    wherein the exchanging of the data at the first data throughput includes an operation of using a mobile high-definition link (MHL) 2.0 protocol, and
    wherein the changing of the first data throughput to the second data throughput includes an operation of changing to a state of using an MHL 1.0 protocol.

6. The method of claim 1, further comprising:
    monitoring a signal strength of the wireless communication while performing the exchanging of the data at the first data throughput,
    wherein the changing of the first data throughput to the second data throughput includes an operation of changing the first data throughput to the second data throughput on a basis of at least one portion of the monitored signal strength.

7. The method of claim 6, wherein the monitoring of the signal strength of the wireless communication includes an operation of monitoring a received signal strength indicator (RSSI) related to the wireless communication.

8. The method of claim 1, further comprising:
    determining an amount of data to be communicated between the electronic device and the external device,
    wherein the changing the first data throughput to the second data throughput includes selecting one of first data throughput and the second data throughput according to the amount of data to be communicated between the electronic device and the external device.

9. An electronic device comprising:
    a redriver integrated circuit (IC);
    a display;
    a memory configured to store instructions therein;
    a transceiver configured to:
        perform a wireless communication with a wireless network,
        connect to an external electronic device using a wired communication, and
        exchange data with the external device at a first data throughput using the wired communication while performing the wireless communication; and
    at least one processor coupled to the memory that, upon execution of the instructions, is configured to:
        disable the redriver IC to change the first data throughput to a second data throughput while performing the wireless communication, and
        when the first data throughput is changed to the second data throughput, control the display to display information on the second data throughput,
    wherein if the redriver IC is enabled, the transceiver is configured to exchange data with the external electronic device at the first data throughput, and
    wherein the redriver IC is configured to correct a signal used to exchange data with the external electronic device at the first data throughput.

10. The electronic device of claim 9, wherein the transceiver is further configured to use a long term evolution (LTE) communication protocol.

11. The electronic device of claim 9, wherein the second data throughput is less than the first data throughput.

12. The electronic device of claim 9, wherein the transceiver is further configured to:
   use a universal serial bus (USB) 3.0 protocol, and
   change from a state of using the USB 3.0 protocol to a state of using a USB 2.0 protocol.

13. The electronic device of claim 9, wherein the transceiver is further configured to:
   use a mobile high definition link (MHL) 2.0 protocol, and
   change to a state of using an MHL 1.0 protocol.

14. The electronic device of claim 9,
   wherein the at least one processor is further configured to monitor signal strength of the wireless communication while performing the exchanging of the data at the first data throughput, and
   wherein the transceiver is further configured to change the first data throughput to the second data throughput on a basis of at least one portion of the monitored signal strength.

15. The electronic device of claim 14, wherein the at least one processor is further configured to monitor a received signal strength indicator (RSSI) related to the wireless communication.

16. A non-transitory computer-readable storage medium storing instructions therein that, when executed, cause at least one processor to be configured to perform the method of claim 1.

\* \* \* \* \*